May 29, 1962 B. E. BISHOP 3,037,169
SIMULTANEOUS PAM-PDM MULTIPLEXER
Filed Jan. 30, 1961

BRUCE E. BISHOP
*INVENTOR*

BY J. M. St. Amand

ATTORNEY

United States Patent Office 3,037,169
Patented May 29, 1962

3,037,169

SIMULTANEOUS PAM-PDM MULTIPLEXER

Bruce E. Bishop, Riverside, Calif., assignor to the United States of America as represented by the Secretary of the Navy Filed Jan. 30, 1961, Ser. No. 85,938
7 Claims. (Cl. 328—104)
(Granted under Title 35, U.S. Code (1952), sec. 266)

The invention herein described may be manufactured and used by or for the Government of the United States of America for governmental purposes without the payment of any royalties thereon or therefor.

The present invention relates to the transmission of Pulse Amplitude Modulated (PAM) signals and Pulse Duration Modulated (PDM) signals, and more particularly to combine PAM and PDM signals into a composite signal and to use this composite signal to convey information from several sources to a remote point. With the present invention, PAM and PDM signals can be combined into a composite signal in which pulse amplitude contains one bit of information and pulse duration contains a second bit of information.

The combination of PAM and PDM signals can be used to modulate a subcarrier oscillator, for example, which in turn can frequency modulate a radio frequency transmitter as in telemeter applications; also, these combined signals can be used to modulate a radio frequency transmitter directly or the combined signal can be transmitted by open wire carrier systems. The received combined signal can be decoded using separate PAM and PDM decoders or can be recorded, on magnetic tape for example, and decoded by two separate runs through a decoder capable of decoding both types of signals.

Previous methods of conveying PAM or PDM information employed separate channels or carriers for each type of signal. The previous methods of transmitting PAM or PDM information required separate channels, subcarrier oscillators or R.F. carriers, for each system. These methods had the disadvantages of not utilizing the channels available for transmitting information to the fullest extent and not taking full advantage of the capabilities of a commutator in the case of telemetering. The instant device overcomes these disadvantages of previous methods.

It is an object of the present invention, therefore, to provide a device for simultaneously transmitting pulse amplitude modulated and pulse duration modulated signals as a composite signal.

It is another object of the invention to provide a system for combining pulse amplitude modulated and pulse duration modulated signals into a composite transmittable signal in which pulse amplitude contains one bit of information and pulse duration contains another bit of information.

It is a further object of the invention to provide a device for transmitting a combination PAM—PDM signal that can be used to modulate a subcarrier oscillator which in turn can frequency modulate a radio frequency transmitter.

Other objects and many of the attendant advantages of this invention will become readily appreciated as the same becomes better understood by reference to the following detailed description when considered in connection with the accompanying drawings wherein.

Figures 1, 2:
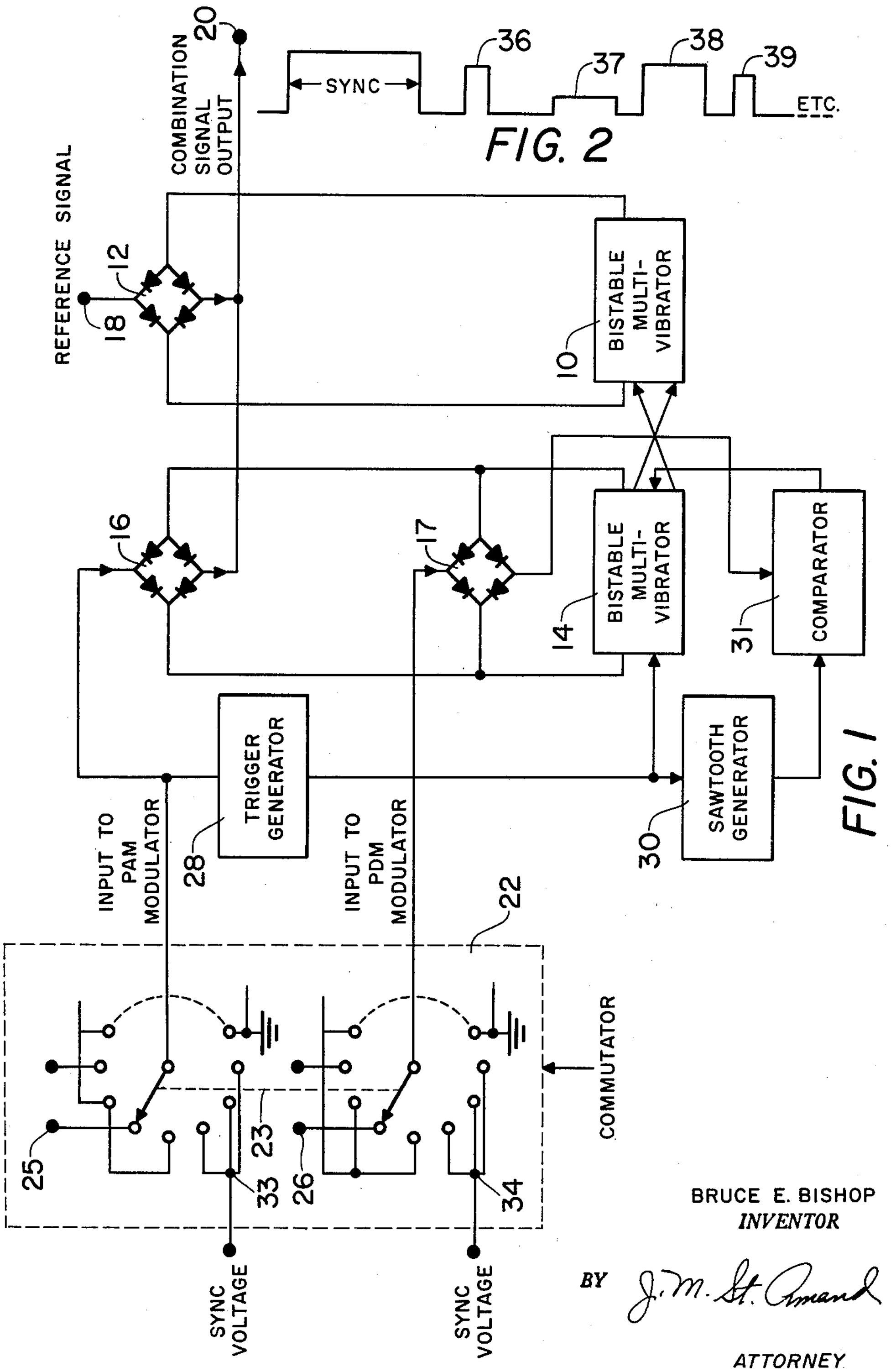
FIGURE 1 is a diagrammatic illustration of a preferred embodiment of the invention showing a simultaneous PAM—PDM multiplexer for mechanical commutator.
FIGURE 2 is an illustration of a typical PAM—PDM signal.

Referring now to FIGURE 1 of the drawings, consider a condition where the bistable multivibrator 10 is holding gate 12 open and bistable multivibrator 14 is holding gate 16 and gate 17 closed. With gate 12 open a reference signal (or ground), applied at point 18, is fed to the common gate output or combination signal output 20. A dual commutator 22 provides input to PAM modulator and input to PDM modulator. When the commutator rotor arm 23 contacts with segment 25 and segment 26 of the commutator, trigger generator 28 conditions bistable multivibrator 14 to open gates 16 and 17, and bistable multivibrator 10 will close gate 12. At the same time, trigger generator 20 turns on saw-tooth generator 30. The output of the sawtooth generator 30 is applied to a comparator 31 which produces a pulse at the instant the sawtooth signal and signal from the gate 17 are at the same level. This pulse from comparator 31 conditions bistable multivibrator 14 to close gates 16 and 17, and bistable multivibrator 10 opens gate 12. Thus, a pulse now appears at the combination signal output 20 whose amplitude is determined by the signal amplitude on the PAM channel applied at 25 and whose duration is determined by the signal amplitude on PDM channel applied at 26. This cycle of events repeats as each alternative segment of the commutator is contacted. At the end of one commutator revolution or frame, a sync pulse may be generated by connecting three consecutive segments together at 33 and at 34, and applying sync voltages thereto. This will result in a standard "Inter Range Instrumentation Group" PAM sync pulse. A typical signal is shown in FIGURE 2.

The typical PAM—PDM signal, illustrated in FIGURE 2 comprises a sync pulse followed by a series of information pulses 36, 37, 38 and 39, for example. For instance, the amplitude of pulse 36 gives a PAM channel 1 information and the duration or width of pulse 36 gives a PDM channel A information; pulse 37 amplitude gives a PAM channel 2 information and its width gives a PDM channel B information; pulse 38 amplitude gives a PAM channel 3 information and its width gives a PDM channel C information; this cycle of events continues for pulse 39, etc.

This PAM—PDM multiplexer permits PAM and PDM signals to be transmitted simultaneously on a single subcarrier or RF carrier; this doubles the amount of information that can be transmitted without increasing the number of communication channels required. This is an important feature in view of hte present congestion in the telemeter bands now in use. The equipment required to generate the combination PAM—PDM signal is considerably less than that required to produce the two signals separately.

Another embodiment of the invention uses an electronic commutator in place of mechanical commutator 22 shown in FIGURE 1.

Obviously many modifications and variations of the present invention are possible in the light of the above teachings. It is therefore to be understood that within the scope of the appended claims the invention may be practiced otherwise than as specifically described.

What is claimed is:

1. A PAM—PDM multiplexer for use in permitting PAM and PDM signals to be transmitted simultaneously on a single composite carrier signal comprising commutator means for simultaneously selecting PAM and PDM signal inputs from individual channels, a trigger generator and a first gate means connected to said commutator means for receiving said PAM signal inputs, a second gate means connected to said commutator means for receiving said PDM signal inputs and a third gate means having a reference voltage applied thereto, the output side of said first and third gate means being connected to the output terminal for said multiplexer, a first bistable multivibrator being parallel connected to said first and second gate means for opening or closing same, a second bistable multivibrator connected to said first bistable multivibrator and to said third gate means for closing said third gate means when said first bistable multivibrator opens said first and second gate means and vice versa, the output side of said trigger generator being connected to a sawtooth generator and said first bistable multivibrator, the output side of said sawtooth generator and said second gate means being connected to a comparator whose output in turn is connected to said first bistable multivibrator, said trigger generator operating to turn on said sawtooth generator and simultaneously to condition said first bistable multivibrator to open said first and second gate means when said commutator means simultaneously and separately selects PAM and PDM signal inputs and said trigger generator receives a PAM signal input, said comparator producing a pulse at the instant a sawtooth signal and a signal from said second gate means are at the same amplitude, said pulse from said comparator conditioning said first bistable multivibrator to close said first and second gate means which in turn conditions said second bistable multivibrator to open said third gate means whereby a signal pulse appears at said multiplexer output whose amplitude is determined by the signal amplitude on the selected PAM input channel and whose duration is determined by the signal amplitude on the simultaneously selected PDM input channel.

2. A device as in claim 1 wherein a cycle of operation repeats for each set of simultaneously selected PAM and PDM signal inputs.

3. A device as in claim 1 wherein means is provided for generating a sync pulse at the end of each commutator revolution.

4. A PAM—PDM multiplexer for use in permitting PAM and PDM signals to be transmitted simultaneously on a single composite carrier signal comprising selecting means for simultaneously selecting individual PAM and PDM signal input channels and feeding the signals from same to first and second gate means respectively, said PAM signals also being fed to a trigger generator, a third gate means having a reference voltage applied thereto, the output side of said first and third gate means being connected to the output terminal for said multiplexer, a first multivibrator connected to said first and second gate means in parallel for opening and closing same, a second multivibrator connected to one side of said first multivibrator for closing said third gate means when said first multivibrator opens said first and second gate means and vice versa, the output of said trigger generator being connected to the other side of said first multivibrator and to a sawtooth generator, the output side of said sawtooth generator and said second gate means being connected to a comparator circuit whose output in turn is connected to said one side of said first multivibrator, a signal from said trigger generator operating to turn on said sawtooth generator and simultaneously condition said first multivibrator to open said first and second gate means when said selecting means simultaneously selects separate PAM and PDM signal inputs and said trigger generator receives a PAM input signal, said comparator producing a pulse at the instant a sawtooth signal and a signal from said second gate means are at the same amplitude which comparator pulse conditions said first multivibrator to close said first and second gate means, said first multivibrator in turn conditioning said second multivibrator to open said third gate means to apply a reference voltage to said multiplexer output, whereby for each simultaneously selected PAM and PDM input signals a signal pulse appears at said multiplexer output whose amplitude is determined by the signal amplitude on the selected PAM input channel and whose duration is determined by the signal amplitude on the simultaneously selected PDM input channel.

5. A device as in claim 4 wherein said gate means are diode bridge circuits.

6. A device as in claim 4 wherein a cycle of operation as set forth therein repeats for each set of simultaneously selected PAM and PDM signal inputs.

7. A device as in claim 4 wherein means is provided for generating a sync pulse at the end of a series simultaneously selected input signals.

No references cited.